United States Patent
Herrell et al.

(10) Patent No.: US 7,480,755 B2
(45) Date of Patent: Jan. 20, 2009

(54) TRAP MODE REGISTER

(75) Inventors: Russ Herrell, Fort Collins, CO (US); Gerald J. Kaufman, Jr., Fort Collins, CO (US); John A. Morrison, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 272 days.

(21) Appl. No.: 11/006,964

(22) Filed: Dec. 8, 2004

(65) Prior Publication Data
US 2006/0123172 A1 Jun. 8, 2006

(51) Int. Cl.
*G06F 13/24* (2006.01)
(52) U.S. Cl. .................. 710/269; 710/260; 710/268
(58) Field of Classification Search .......... 710/260–269
See application file for complete search history.

(56) References Cited

U.S. PATENT DOCUMENTS

| | | | | | |
|---|---|---|---|---|---|
| 5,632,028 | A | * | 5/1997 | Thusoo et al. | 703/26 |
| 5,901,312 | A | * | 5/1999 | Radko | 718/104 |
| 6,336,184 | B1 | * | 1/2002 | Burke et al. | 712/244 |
| 6,496,847 | B1 | * | 12/2002 | Bugnion et al. | 718/1 |
| 6,502,152 | B1 | * | 12/2002 | Laurenti | 710/264 |
| 6,772,259 | B2 | * | 8/2004 | Corrigan et al. | 710/260 |
| 6,799,316 | B1 | * | 9/2004 | Aguilar et al. | 718/1 |
| 7,272,709 | B2 | * | 9/2007 | Zitlaw et al. | 713/2 |
| 2002/0099863 | A1 | * | 7/2002 | Comeau et al. | 709/310 |
| 2004/0158736 | A1 | * | 8/2004 | Watt et al. | 713/200 |
| 2005/0144347 | A1 | * | 6/2005 | Kitamura et al. | 710/260 |
| 2006/0130130 | A1 | * | 6/2006 | Kablotsky | 726/9 |

OTHER PUBLICATIONS

German Office Action dated Jan. 12, 2007, for German Appl. No. 10 2005 055 715.A-53 (from U.S Appl. No. 11/008,964), Apol: Hewlett-Packard: pp. 1-4.
Brown et al., Rapid Prototyping & Evaluation of . . . Conference or Exper. Research in Computer Systems, NSF Exper. Systems, Jun. 21-22, 1996, pp. 1-10, Univ. of MI.

* cited by examiner

*Primary Examiner*—Glenn A Auve
*Assistant Examiner*—Nimesh G Patel

(57) ABSTRACT

Systems, methodologies, media, and other embodiments associated with a system configured with a trap mode register, multiple interrupt vector address registers, and multiple interrupt vector tables are described. One exemplary system embodiment includes a logic for initializing the trap mode register, for initializing interrupt vector address registers, and for initializing interrupt vector tables. When a trap occurs in a computer configured with the exemplary system, the trap mode register may select, based, for example, on the trap type or a trap data, an associated interrupt vector address register to provide an address of an interrupt vector table through which a trap handler can be invoked.

40 Claims, 12 Drawing Sheets

Prior Art Figure 1

TRAP MODE REGISTER

BACKGROUND

Conventional computing systems may detect and handle traps and/or interrupts. The term "interrupt" will be used herein in a manner that is intended to include both interrupts and traps. Similarly, the term "trap" will be used herein in a manner that is intended to include both interrupts and traps. A typical computing system may interact with a single interrupt vector register that stores the address of a single interrupt vector table. The interrupt vector register, and an interrupt vector record may facilitate indexing into the interrupt vector table to locate an interrupt service routine or trap handler. For example, the interrupt vector table may store an interrupt service routine and/or may store an entry point for an interrupt service routine.

Conventional computing systems may run an operating system that interacts with interrupt servicing. Typically, the operating system may have access to the interrupt vector register and/or the interrupt vector table. Thus, memory associated with trap handlers, interrupt service routines, and so on, may be accessible, either intentionally or unintentionally, to processes for which access would ideally be denied.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

Prior Art

DETAILED DESCRIPTION

Figure 1:
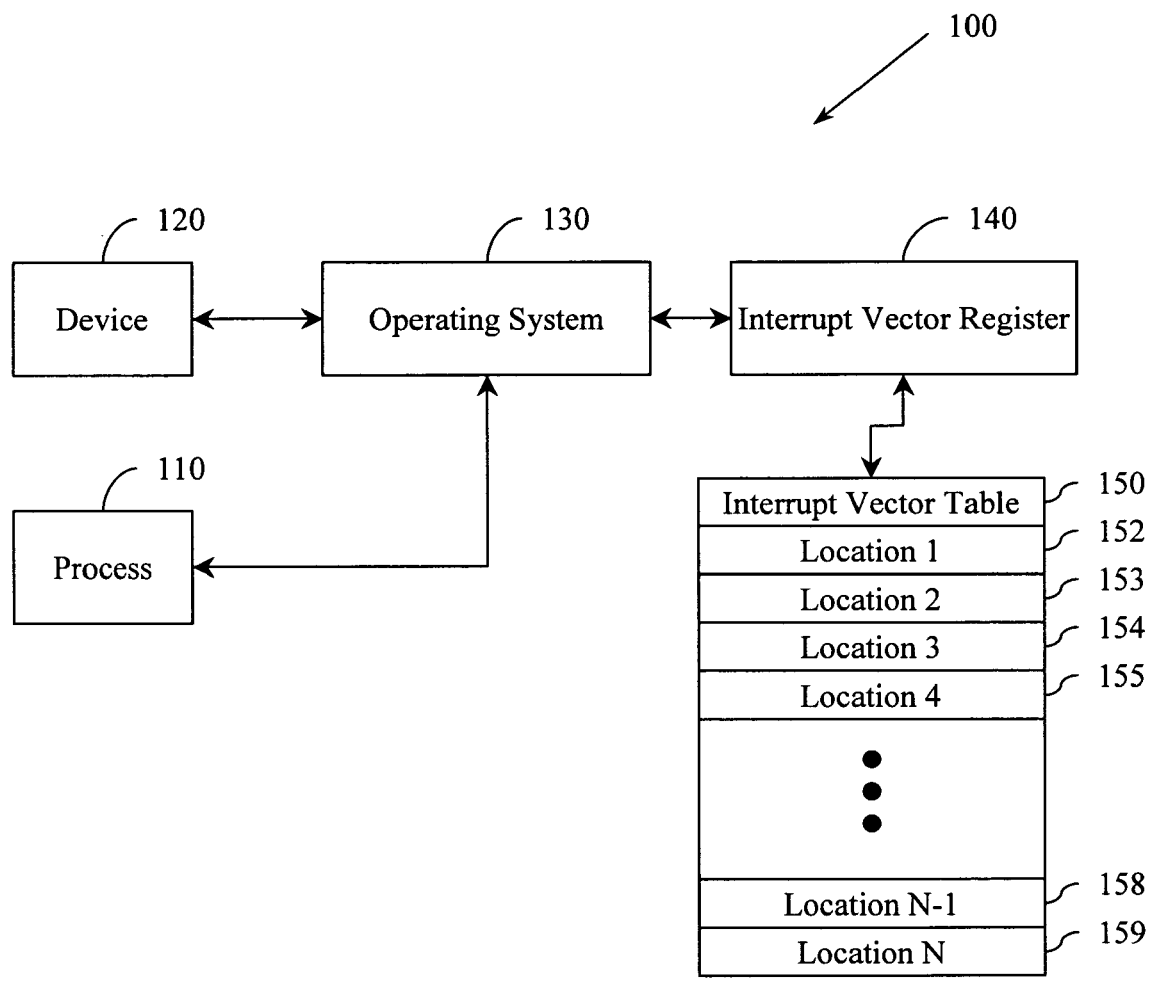
FIG. 1 illustrates an example computer system configured with a single interrupt vector register and a single interrupt vector table.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, "interrupt" refers to a signal informing a logic that an event has occurred. An interrupt may occur when an exceptional event causes automatic transfer to a special logic for handling that event. When an interrupt occurs, a first process may be suspended in such a way that the first process can be resumed after handling the interrupt. Interrupts may come from hardware, software, and other sources. In some contexts, interrupts whose source is a hardware device may be referred to as hardware interrupts or just interrupts. Similarly, interrupts whose source is software may be referred to as software interrupts and/or traps. In this application, "interrupt" and "trap" will be used synonymously to refer to hardware and/or software interrupts. Similarly, the terms "interrupt service routine" and "trap handler" will be used synonymously.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer-readable medium", as used herein, refers to a medium that participates in directly or indirectly providing instructions and/or data. A computer-readable medium may take forms, including, but not limited to, non-volatile media, and volatile media. Non-volatile media may include, for example, optical or magnetic disks and so on. Volatile media may include, for example, optical or magnetic disks, dynamic memory and the like. Common forms of a computer-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. A logic may include one or more gates, combinations of gates, or other circuit components. A logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected and that may facilitate transferring information.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically and/or statically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Prior Art FIG. 1 illustrates a conventional computer system 100 configured with a single interrupt vector register 140 and a single interrupt vector table 150. Typically, a process 110 or device 120 may cause an interrupt that may be detected by computer hardware associated with computer system 100 and, in some cases, handled by an operating system 130. Operating system 130 may attempt to handle the interrupt. Handling an interrupt may be facilitated by the interrupt vector register 140 and the interrupt vector table 150 providing data that facilitates locating an interrupt handler. For example, the interrupt vector register 140 may store the address of the single interrupt vector table 150 or include other data that facilitates locating the interrupt vector table 150 and/or entries in the interrupt vector table 150. The interrupt vector table 150 typically stores program entry points for interrupt service routines. In some cases, the interrupt vector table 150 may store code (e.g., interrupt service routines) rather than entry addresses for those routines.

When computer hardware with which operating system 130 is associated detects an interrupt generated by process 110 and/or device 120, operating system 130 may access the interrupt vector register 140 to acquire the address of the interrupt vector table 150. The operating system 130 may then index into the interrupt vector table 150 using index data like an interrupt number. The index data facilitates locating one of the entries (e.g., 152 through 159) in the interrupt vector table 150. Typically, the index data (e.g., interrupt number) corresponds to exactly one entry in the interrupt vector table 150.

Conventionally, at any moment in time there is exactly one interrupt vector register 140 and exactly one interrupt vector table 150 available to operating system 130. Furthermore, the interrupt vector register 140 and the interrupt vector table 150 are typically accessible to the operating system 130. Thus, the operating system 130 may initialize the interrupt vector register 140 and/or the interrupt vector table 150, may reprogram the interrupt vector register 140 and/or the interrupt vector table 150, and so on.

Figure 2:
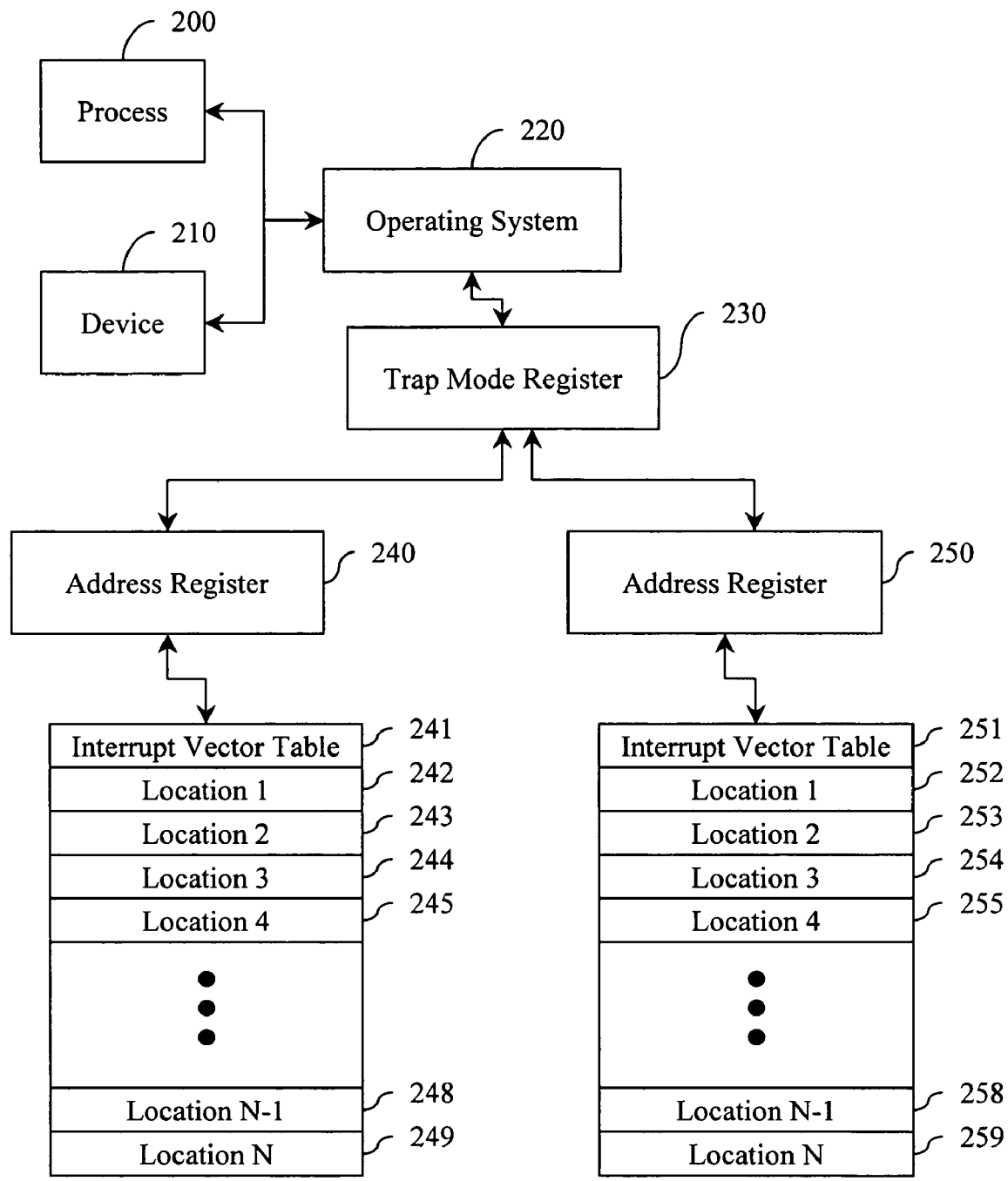
FIG. 2 illustrates an example computer system configured with a trap mode register, two address registers, and two interrupt vector tables.

FIG. 2 illustrates an example system that includes a trap mode register 230, two address registers (240, 250) and two interrupt vector tables (241, 251). Process 200 and/or device 210 may produce interrupts that may be detected by computer hardware associated with operating system 220. It is to be appreciated that in some examples device 210 may be an actual device or a virtual device. Instead of having exactly one address register and exactly one interrupt vector table available to locate an interrupt service routine, operating system 220 and/or a processor (not illustrated) running operating system 220 may interact with a trap mode register 230 that has access to two or more address registers and thus to two or more interrupt vector tables.

The trap mode register 230 may be operably connected to the operating system 220 and may be configured to receive, upon the occurrence of an interrupt, a trap data associated with the interrupt. The trap mode register 230 may also be configured to facilitate selecting between a first address register 240 and a second address register 250 to provide an address associated with an interrupt vector table that will supply, for example, the address of an interrupt service routine and the like. Which address register is selected by trap mode register 230 may be based, at least in part, on the trap data. In one example, the trap data may include information like an interrupt type identifier, and an address associated with a device (e.g., 210) responsible for causing the interrupt, a process (e.g., 200) responsible for causing the interrupt, and a memory location responsible for causing the interrupt.

The trap mode register 230 may have available a first interrupt vector table 241 that is configured to facilitate locating an interrupt service routine associated with handling interrupts from a first set of interrupt types. For example, interrupt vector table 241 may include interrupt service routines for handling interrupts from physical (e.g., not virtual) devices. The first interrupt vector table 241 may be associated with a first address register 240 that is configured to provide an address associated with the first interrupt vector table 241 to the trap mode register 230. The first address register 240 may also facilitate locating an entry in the first interrupt vector table 241 by providing an entry point into the first interrupt vector table 241. In one example, the first address register 240 and/or the first interrupt vector table 241 may be accessible to operating system 220. Therefore, operating system 220 may be responsible for initializing address register 240 and/or interrupt vector table 241.

Unlike conventional systems, trap mode register 230 may also have available a second interrupt vector table 251 that is configured to facilitate locating an interrupt service routine associated with handling an interrupt from a second set of interrupts. For example, interrupt vector table 251 may include interrupt service routines for handling interrupts from virtual (e.g., not physical) devices. The second interrupt vector table 251 may also be associated with second address register 250, which is configured to provide an address associated with the second interrupt vector table 251 to trap mode register 230. The second address register 250 may also facilitate locating an entry in the second interrupt vector table 251. In one example, the second address register 250 and/or the second interrupt vector table 251 may not be accessible to operating system 220.

With two address registers available, and thus with two interrupt vector tables available, the trap mode register 230 may be configured to locate interrupt service routines for a first set of interrupts in a first interrupt vector table and to locate interrupt service routines for a second set of interrupts in a second interrupt vector table.

Operating system 220 may be configured to process, in addition to conventional interrupts, an "unimplemented address" trap. When process 200 or device 210 attempts to access a memory address that is not implemented, an unimplemented address trap may be generated. Thus, operating system 220 and trap mode register 230 may be configured to locate a handler for an unimplemented address trap. For example, an unimplemented address trap may be a member of the second set of interrupts and thus control the trap mode register 230 to select the second address register 250 and thus to locate an interrupt service routine in the second interrupt vector table 251. In one example, the unimplemented address trap may be generated, for example, by an attempt by process 200 or device 210 to access an address associated with a trappable address range. In another example, the unimplemented address trap may be generated by an action associated with a virtual device. Thus, the unimplemented address trap may be useful for implementing a virtualization system external to operating system 220.

The interrupt vector tables may, in various examples, store different information. For example, the first interrupt vector table 241 may store data including, but not limited to, a set of interrupt service routine entry points, and a set of interrupt service routines. Similarly, the second interrupt vector table 251 may store data including, but not limited to, a set of interrupt service routine entry points, and a set of interrupt service routines. In one example, the first interrupt vector table 241 may facilitate locating interrupt service routines that are accessible to operating system 220 while the second interrupt vector table 251 may facilitate locating interrupt service routines that are not accessible to operating system 220. For example, interrupt service routines locatable through interrupt vector table 251 may concern a virtualization system of which operating system 220 may not be aware.

While two address registers and two interrupt vector tables are illustrated in FIG. 2 it is to be appreciated that trap mode register 230 may have access to two or more address registers and thus to two or more interrupt vector tables. Furthermore, while both address registers and thus both interrupt vector tables are illustrated as being one level of indirection from trap mode register 230, other address registers and/or interrupt vector tables may be located at other levels of indirection from trap mode register 230. Thus, the additional tables may facilitate adding support for input/output virtualization via a hierarchy of multiple, independent virtualization layers. Two or more tables and registers may also be employed with other example systems described herein.

Figure 3:
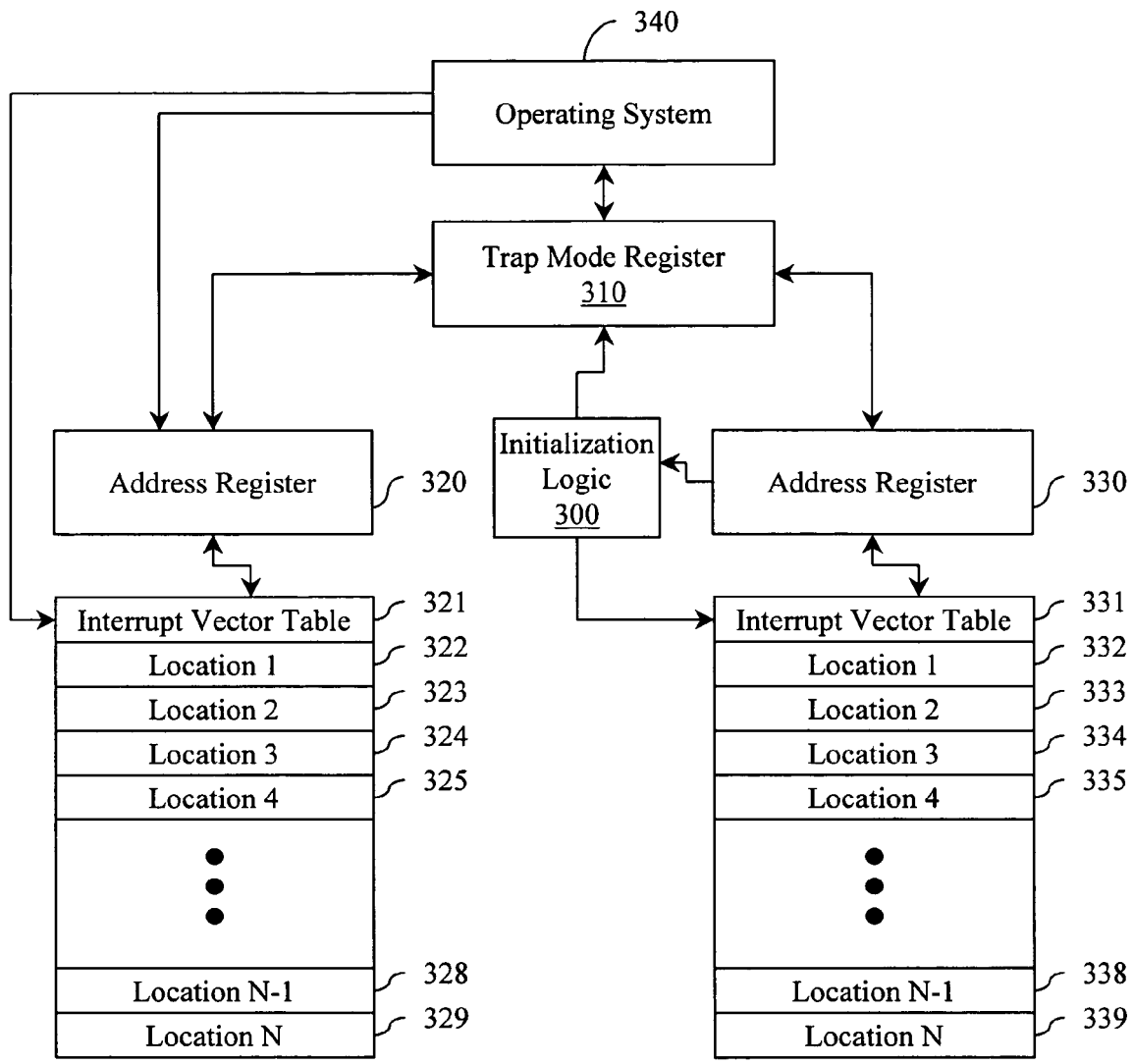
FIG. 3 illustrates another example computer system configured with a trap mode register, two address registers, and two interrupt vector tables.

FIG. 3 illustrates an example computer based system that includes a trap mode register 310, two address registers (320, 330) and two interrupt vector tables (321, 331). As described above in connection with FIG. 2, for interrupts detected by operating system 340, the trap mode register 310 may select an address register from which data like the address of an interrupt vector table may be retrieved. Thus, trap mode register 310 may facilitate locating an interrupt service routine.

FIG. 3 illustrates trap mode register 310, address register 330, and interrupt vector table 331 being operably connected to an initialization logic 300. The initialization logic 300 may be configured to initialize the trap mode register 310, interrupt vector table 331, and the address register 330. Furthermore, the initialization logic 300 may be configured to provide a signal for controlling an operating system initialization logic (not illustrated) that is operably connected to the operating system 340. In one example, the initialization logic 300 may provide the signal to the operating system initialization logic after initializing trap mode register 310, interrupt vector table 331, and address register 330. The signal may cause operating system 340 to begin operation (e.g., to boot). Thus, the information stored in trap mode register 310, address register 330, and/or interrupt vector table 331 may be established before operating system 340 begins running. This may facilitate keeping the information stored in the trap mode register 310, address register 330, and/or interrupt vector table 331 inaccessible to operating system 340.

While initialization logic 300 may initialize trap mode register 310, address register 330, and interrupt vector table 331, operating system 340 may initialize interrupt vector table 321 and address register 320. Thus, interrupt vector table 321 and address register 320 may be accessible to operating system 340. Being able to separate interrupt vector tables that are and are not accessible to operating system 340 facilitates providing an external virtualization system to support operating system 340 and/or a processor configured without a virtualization system. Interrupts associated with virtual devices may involve handlers associated with address register 330 and interrupt vector table 331 that are initialized by initialization logic 300. Similarly, interrupts associated with physical devices may involve interrupt service routines associated with address register 320 and interrupt vector table 321 that were initialized by and may be accessed by operating system 340.

In one example, initialization logic 300 may be configured to define a virtual device and to provide information concerning the virtual device to operating system 340. Thus, initialization logic 300, trap mode register 310, address register 330 and interrupt vector table 331 may facilitate providing an external virtualization system for operating system 340 and/or a processor on which operating system 340 runs. The functions of the external virtualization system may be made available to operating system 340 even though operating system 340 may not be able to access the external virtualization system directly. For example, initialization logic 300 may be configured to initialize the interrupt vector table 331 with data including, but not limited to, a set of virtual device driver entry points, and a set of virtual device drivers, where the virtual device drivers form part of a virtualization system. In one example, the set of virtual device drivers may be located (e.g., stored) in initialization logic 300. The initialization logic 300 may be implemented, for example, in firmware. Thus, operating system 340 may be able to invoke the virtual device drivers but not be able to change the contents of those drivers.

In a central processing unit (CPU) architecture where external interrupts are vectored through an interrupt vector table, the virtualization provided by trap mode register 310, multiple address registers, and multiple interrupt vector tables may be employed to vector external interrupts to virtualization code like a virtual device driver by extending the trap mode register 310 to process external interrupts. Thus, virtualization code may have the opportunity to inspect an interrupt and to determine whether it is from a device associated with the virtualization system. If an interrupt is associated with the virtualization system, then the virtualization code (e.g., code associated with interrupt vector table 331) may handle it. Otherwise, if the interrupt is associated with the operating system 340, then code associated with interrupt vector table 321 may process the interrupt.

While two address registers and two interrupt vector tables are illustrated, it is to be appreciated that trap mode register 310 may be operably connected to two or more address registers and thus have access to two or more alternate interrupt vector tables.

Figure 4:
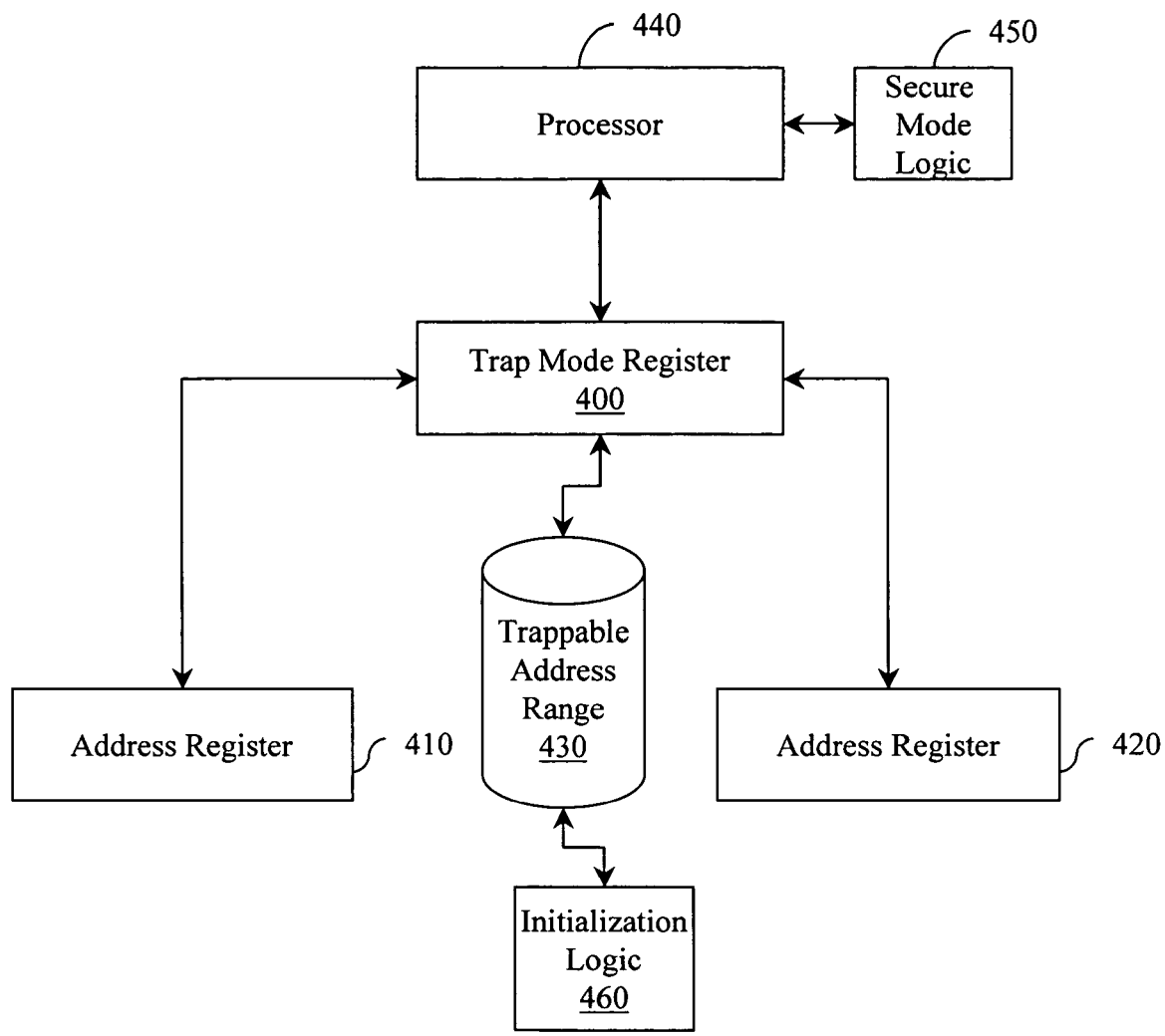
FIG. 4 illustrates another example computer system configured with a trap mode register, and two address registers.

FIG. 4 illustrates an example computer system configured with a trap mode register 400, a first address register 410, and a second address register 420. Interrupt vector tables associated with the address registers (410, 420) are not illustrated, but it is to be appreciated that trap mode register 400 may employ the address registers (410, 420) similarly to trap mode register 230 (FIG. 2) and 310 (FIG. 3) to access interrupt vector tables. FIG. 4 also illustrates a data store 430 operably connected to trap mode register 400.

Data store 430 may be configured to store data concerning a trappable address range. The trappable address range may control when a processor 440 and/or operating system (not illustrated) detects and/or produces an "unimplemented address" trap and/or a "trappable address range" trap. For example, initialization logic 460 may be configured to store a trappable address range in data store 430 for which unimplemented address traps are desired. Then, an attempt to access an address in the trappable address range may cause an unimplemented address trap.

Unfortunately, in some examples, an operating system and/or application code running on processor 440 may compromise, intentionally and/or unintentionally, virtualization provided by trap mode register 400 and its related computer components and data stores by altering the trap mode register 400, the address registers (410, 420), interrupt service routines, and so on. Thus, FIG. 4 also illustrates a secure mode logic 450 operably connected to processor 440. The trappable address range stored in data store 430 may interact with secure mode logic 450 to facilitate preventing compromising the virtualization.

For example, to facilitate implementing an external virtualization system for processor 440, a memory location in the protected address range may be accessible to initialization logic 460 and inaccessible to processor 440 and/or an operating system running on processor 440. Secure mode logic 450 may be configured to facilitate controlling access to the protected address range. For example, memory locations associated with the protected address range may be accessible to interrupt service routines reachable through address register 420 but not through address register 410. Similarly, while memory locations outside the protected address range may be accessible to interrupt service routines reachable through address register 410. In the absence of secure mode logic 450, processor 440 and/or an operating system running on processor 440 may agree voluntarily to not access certain addresses. However, malicious and/or flawed code may intentionally and/or inadvertently access those addresses, potentially compromising a virtualization system implemented in those addresses.

Thus, in one example, trap mode register 400, address registers (e.g., address register 420), and/or interrupt vector tables (not illustrated) associated with the address registers may have addresses that are located in the protected address range identified in data store 430. The protected address range may be initialized by the initialization logic 460 before processor 440 begins operation. Additionally, and/or alternatively, data associated with the protected address range may be updated by initialization logic 460 and/or by code running in the protected address range. The protected address range may be, for example, a single contiguous address range, various blocks of addresses, and so on.

While a virtualization system is described, it is to be appreciated that trap mode register 400 working together with multiple address registers and multiple interrupt vector tables may also provide other functionality. For example, a debug system, a logging system, and other systems may be provided. Additionally, trap mode register 400 working together with multiple address registers and multiple interrupt vector tables may facilitate pre-boot firmware "hiding" code from a processor and/or operating system. Thus, configuration routines, security functions, and so on, may be implemented and selectively invoked through an entry point like an unimplemented address trap or a trappable address range trap.

Providing a trappable address range also facilitates mitigating issues associated with using an unimplemented address trap for virtual devices. For example, by mapping virtual devices to addresses in a trappable address range, virtual devices may generate a type of trap other than an unimplemented address trap. Thus, if an actual unimplemented address trap occurs, processing to determine whether the unimplemented address trap is associated with a virtual device or is really associated with an unimplemented address may not be required.

Figure 5:
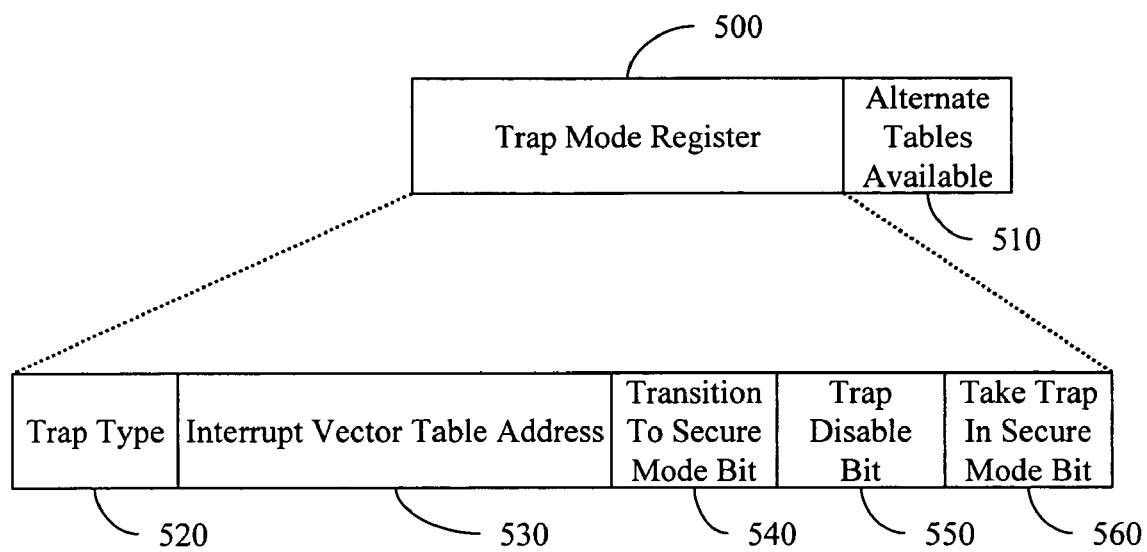
FIG. 5 illustrates an example trap mode register.

FIG. 5 illustrates an example trap mode register 500. In one example, trap mode register 500 may be associated with a field 510 and/or data store that stores information concerning whether an alternate interrupt vector table is available to locate interrupt service routines, and the like. By way of illustration, if field 510 indicates that alternate tables are not available, then trap mode register 500 may be configured to locate interrupt handlers in a default interrupt vector table accessible via a default address register without considering alternate address registers. However, if field 510 indicates that an alternate table is available, then trap mode register 500 may be configured to attempt to locate alternate interrupt handlers in alternate interrupt vector tables accessible by alternate address registers. Field 510 facilitates selectively turning on/off alternate vector table processing and thus may facilitate, for example, selectively turning on/off a virtualization system based on alternate vector tables. In one example, an initialization logic (e.g., logic 460, FIG. 4) may manipulate (e.g., set/clear) field 510.

Trap mode register 500 may include various fields. In one example, trap mode register 500 may include a field 520 that is configured to store a trap type data. For example, traps that can be detected by a system may have a unique code that identifies the trap type. In one example, the unique code may facilitate indexing into an interrupt vector table. For example, a trap type may be an integer number that, when multiplied by an entry size for an interrupt vector table, facilitates determining an address for an interrupt service routine in an interrupt vector table. While an integer number and an entry size are described, it is to be appreciated that other indexing and handler locating techniques may be employed.

Trap mode register 500 may also include a field 530 that is configured to store information like an interrupt vector table address retrieved from an address register. The address register from which the address is retrieved may be determined, as described above, by data stored in the trap type field 520. The address register associated with a trap type may be fixed, for example, in hardware, firmware, and so on. In another example, the address register associated with a trap type may be dynamic and may change as different conditions occur.

Trap mode register 500 may also include a field 540 that is configured to store information concerning whether an interrupt type will control a processor associated with the trap mode register 500 to enter a secure mode. As described above, a secure mode logic or other logic may be configured to make some memory locations inaccessible to an operating system and/or application code. These memory locations may only be accessible to a processor when a logic like a secure mode logic detects that the processor, operating system, application code, and/or so on, are operating in a secure mode. A designer may desire that certain interrupts (e.g., unimplemented address traps) cause the secure mode to be entered. Thus, the "transition to secure mode" field 540 may store information that a secure mode logic or other logic may employ to cause a transition to secure mode. While the transition to secure mode field 540 is illustrated as a single bit field, it is to be appreciated that fields of other sizes and types may be employed.

Trap mode register 500 may also include a field 550 that is configured to store information concerning whether an interrupt type is enabled. For example, at different times, a system may not desire or may not be capable of handling different types of interrupts. Thus, rather than allow a jump to an interrupt service routine for an interrupt type that the system does not want to handle, information may be stored in a trap disable bit 550 that will facilitate controlling a system not to take the interrupt. Field 550 may also facilitate controlling whether an interrupt type will be disabled when a processor is in secure mode. This may facilitate preventing, for example, an endless loop on an unimplemented address trap. Again, while the trap disable field 550 is illustrated as being a single bit field, it is to be appreciated that fields of other sizes and types may be employed.

Trap mode register 500 may also include a field 560 to store information concerning whether an interrupt type is to be handled in a secure mode. While field 540 may store information concerning whether a trap causes a transition to a secure mode, field 560 may store information concerning whether a certain interrupt may only be handled in a secure mode, without including information about whether that interrupt can cause the transition. Thus, fields 560 and 540 may store different information concerning a state desired to process an interrupt and a potential state transition caused by an interrupt. Information stored in field 560 may specify, for example, whether an interrupt is taken in secure mode to allow secure code residing in a protected address range to execute without an infinite loop on an address range trap. While the "take trap in secure mode" field 550 is illustrated as a single bit field, it is to be appreciated that fields of other sizes and types may be employed. Additionally, while five fields are illustrated in trap mode register 500, it is to be appreciated that a greater and/or lesser number of fields, and that various combinations of the illustrated fields may be employed.

Figure 6:
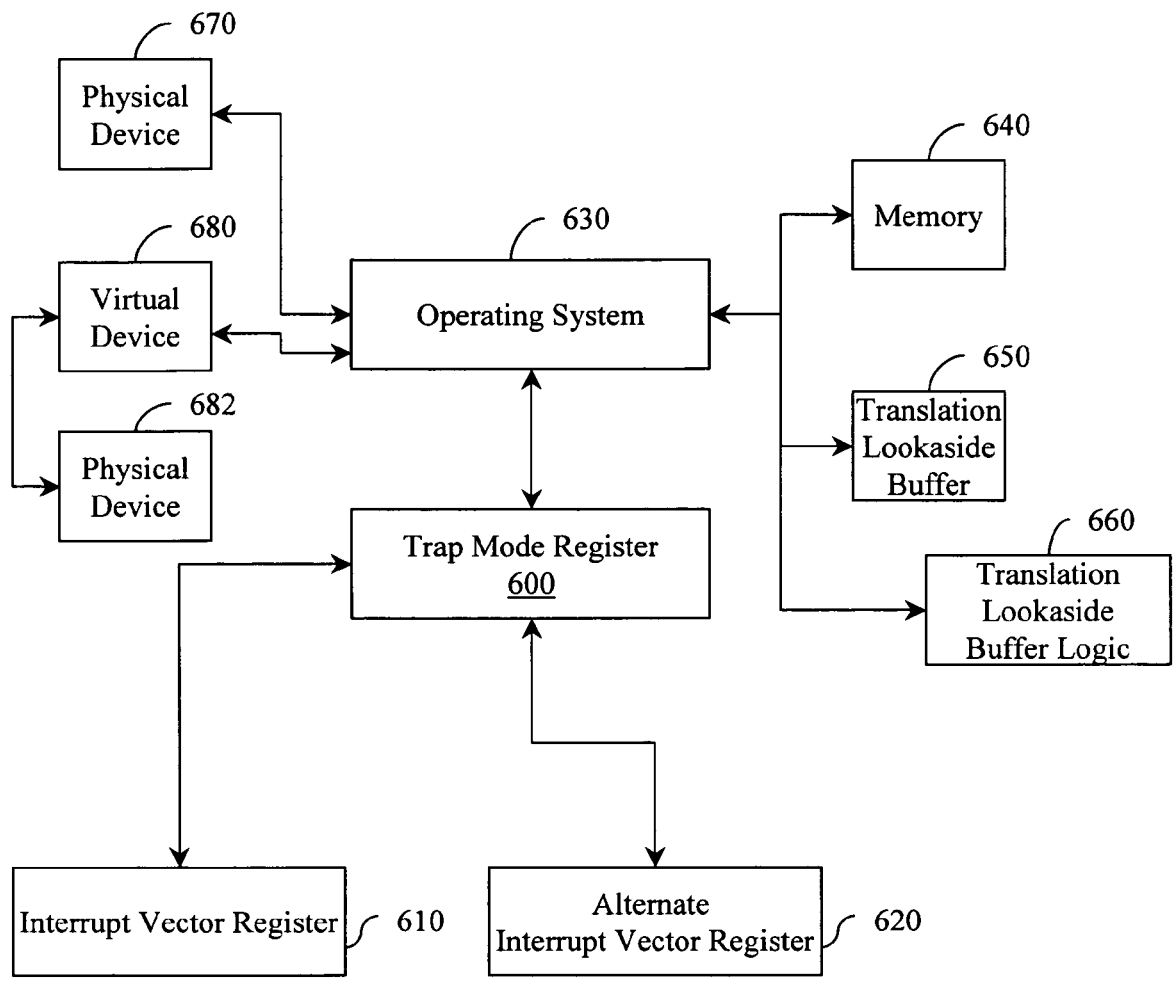
FIG. 6 illustrates an example computer system configured with a trap mode register, two interrupt vector registers and a translation lookaside buffer logic.

FIG. 6 illustrates a computer based system configured with a trap mode register 600 and multiple interrupt vector registers (610, 620) that may be configured to store addresses that facilitate locating an interrupt service routine, and the like. FIG. 6 illustrates that trap mode register 600 may interact with an operating system 630 that is in turn interacting with a physical device 670 and a virtual device 680. The virtual device 680 may in turn be interacting with or implemented in a physical device 682. The physical devices 670 and 682 and/or virtual device 680 may make memory references to a memory 640. Memory 640 may accommodate physical memory and virtual memory accesses. When a system employs virtual memory, a translation lookaside buffer 650 may be employed to facilitate physical to virtual and virtual to physical address translations or mappings. When an address translation or mapping occurs, operating system 630 and/or a translation lookaside buffer logic 660 may manipulate (e.g., create, destroy, alter) an entry (e.g., record) in the translation lookaside buffer 650.

Thus, a system configured with a trap mode register 600 may include a translation lookaside buffer logic 660 that is configured to selectively set an address range attribute in a translation lookaside buffer 650 entry. The address range attribute may facilitate determining, for example, whether a memory access that caused the physical/virtual address mapping to occur or to be referenced will cause an interrupt like an unimplemented address trap. Thus, in one example, the translation lookaside buffer logic 660 may be configured to selectively invoke a virtualization process when an unimplemented address range trap occurs. By way of illustration, an interrupt may occur when code running outside a secure mode attempts to insert an entry into translation lookaside buffer 650. An interrupt service routine may examine the real address associated with the entry. If the real address is in a trappable address range, then the interrupt service routine may set an address range attribute in the entry, insert the entry into the translation lookaside buffer 650, and return. Thus, a real to virtual mapping may be flagged as being in a trappable address range. Then, when an access is attempted to a virtual address whose translation lookaside buffer 650 entry has the address range attribute flagged, an address range trap may be taken and virtualization code invoked. Since translation lookaside buffer 650 entries already have attributes that have to be examined and that cause interrupts, performance degradations associated with adding an external virtualization system based on a trap mode register 600 may be mitigated.

Figure 7:
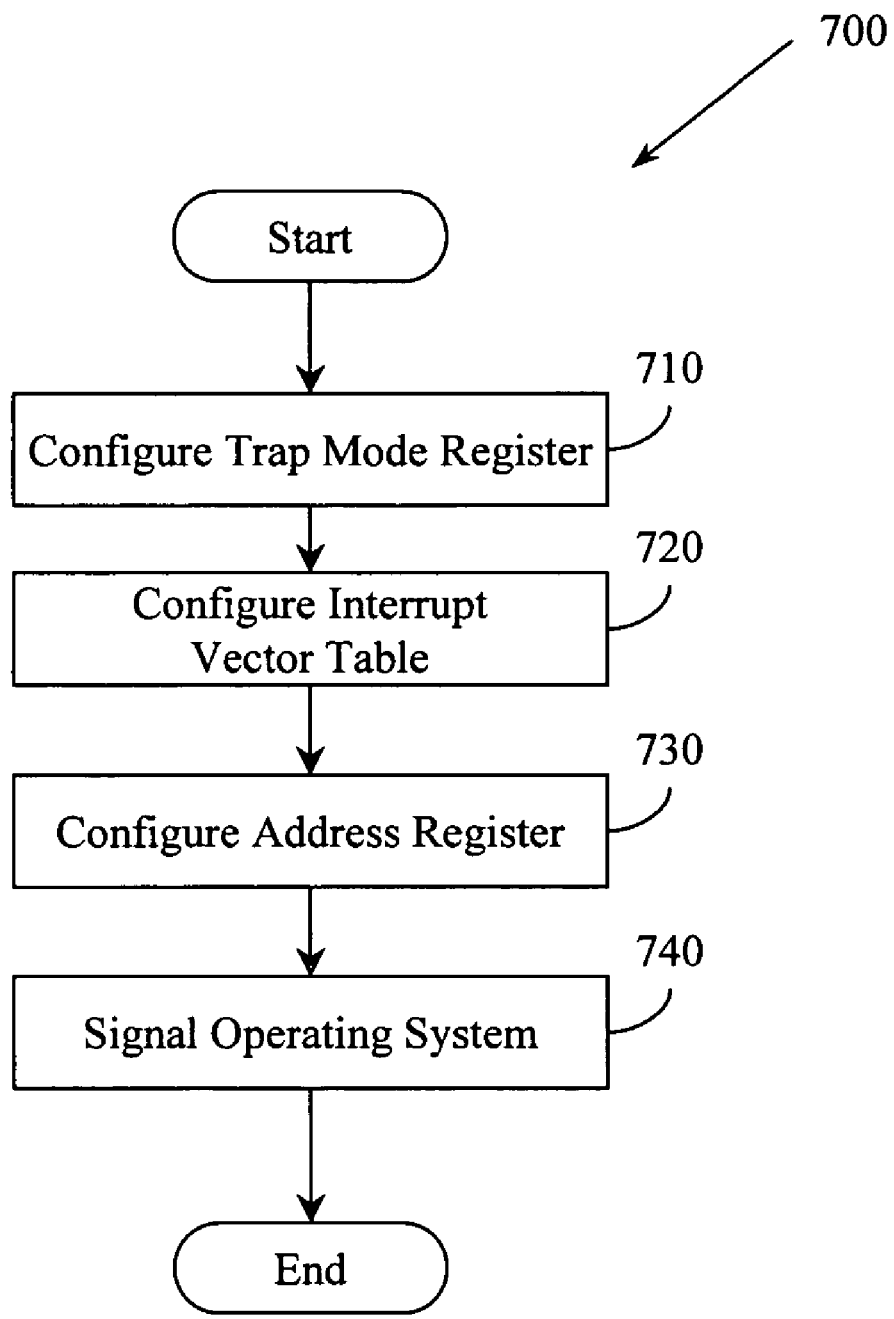
FIG. 7 illustrates an example method associated with configuring a computer system configured with a trap mode register, multiple address registers, and multiple interrupt vector tables.
Figure 8:
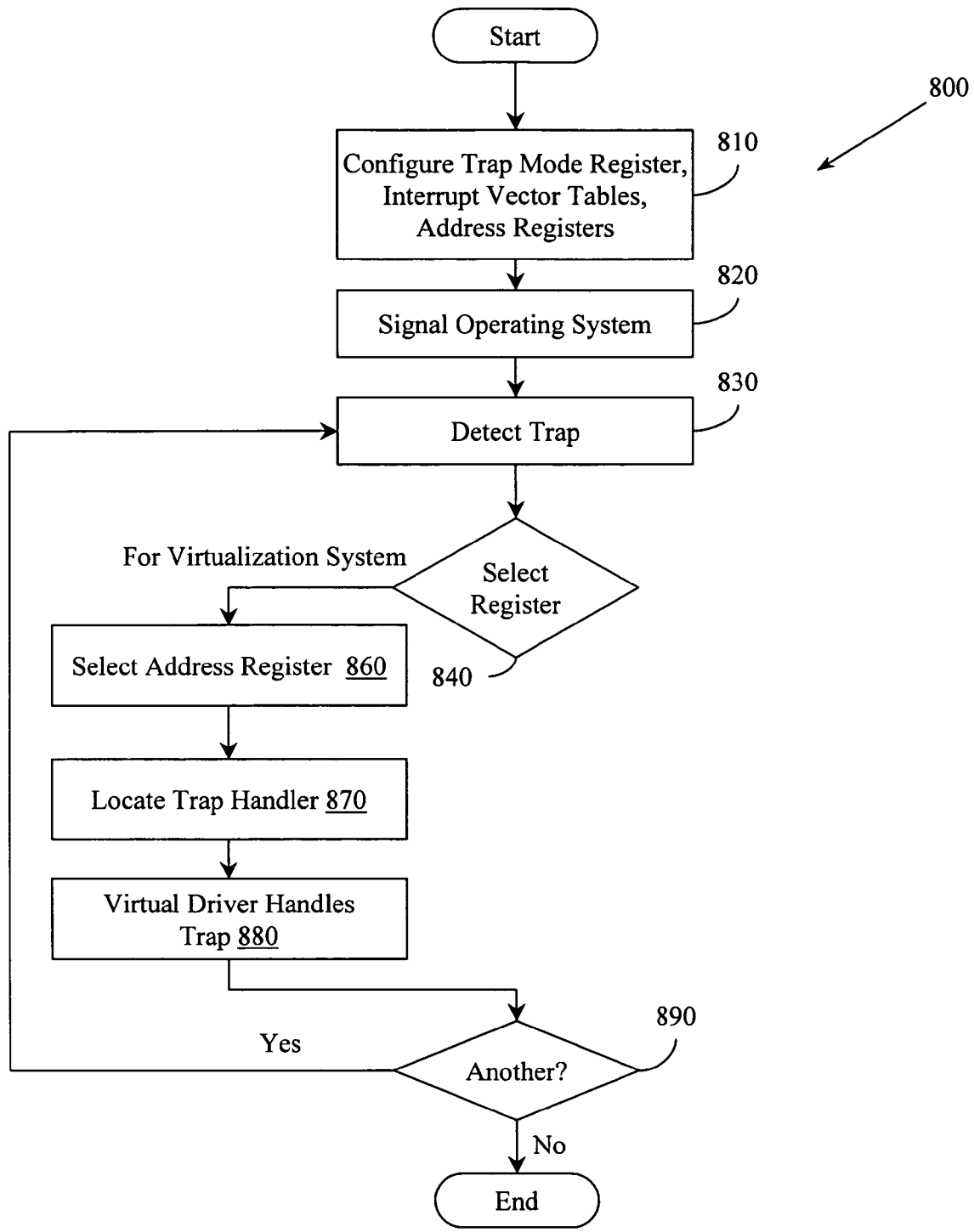
FIG. 8 illustrates an example method associated with handling interrupts in a computer system configured with a trap mode register, multiple address registers, and multiple vector tables.

Example methods may be better appreciated with reference to the flow diagrams of FIGS. 7 and 8. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. The processing blocks may represent a method step and/or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

FIG. 7 illustrates an example method 700 associated with configuring a computer system configured with a trap mode register, multiple address registers, and multiple interrupt vector tables. In one example, method 700 may be run from a firmware (e.g., initialization logic) before an operating system that will interact with the configured trap register boots. Thus, in one example, method 700 may include generating a signal that controls a boot logic to initiate an operating system boot process.

Method 700 may include, at 710, configuring a trap mode register to select an address register to provide the address of an interrupt vector table based, at least in part, on a trap type. For example, a trap mode register may be operably connected to a set of address registers. Based on a trap type, the trap mode register may determine from which of the set of address registers to retrieve an interrupt vector table address. Configuring a trap mode register may include, for example, relating a trap type to an address register. Additionally, and/or alternatively, configuring a trap mode register may include selectively relating a secure mode transition indicator with a trap type. Similarly, configuring a trap mode register may include selectively relating a disabled indicator with a trap type and/or selectively relating a perform in secure mode indicator with a trap type.

Method 700 may also include, at 720, configuring an interrupt vector table to facilitate locating an interrupt service routine. In one example, the interrupt service routine may be configured to handle interrupts associated with device virtualization. While interrupts are described, it is to be appreciated that traps may also be handled. Configuring an interrupt vector table may include, for example, establishing a set of interrupt service routine entry points in an interrupt vector table, establishing a set of interrupt service routines in an interrupt vector table, and so on.

Method 700 may also include, at 730, configuring an address register to facilitate locating an interrupt service routine associated with an interrupt vector table. Configuring an address register may include storing in the address register an address associated with an interrupt vector table that relates the interrupt vector table to the address register.

Method 700 may also include, at 740, signaling an operating system that trap mode register configuration, interrupt vector table configuration, and address register configuration is complete. This signal may allow an operating system to begin its boot operations, for example. Delaying the signaling until 740 may facilitate separating virtualization system code from operating system code, for example.

While FIG. 7 illustrates various actions occurring in serial, it is to be appreciated that various actions illustrated in FIG. 7 could occur substantially in parallel. By way of illustration, a first process could configure a trap mode register, a second process could configure an interrupt vector table and address register, and a third process could signal an operating system. While three processes are described, it is to be appreciated that a greater and/or lesser number of processes could be employed and that lightweight processes, regular processes, threads, and other approaches could be employed. It is to be appreciated that other example methods may, in some cases, also include actions that occur substantially in parallel.

In one example, additional configurations may occur. For example, a virtual device(s) may be defined with its addresses being in a range of unimplemented addresses and/or in a trappable address range. Thus, a trappable address range may be configured. Furthermore, a virtual device driver entry point for the virtual device may be configured into the interrupt vector table.

Figure 12:
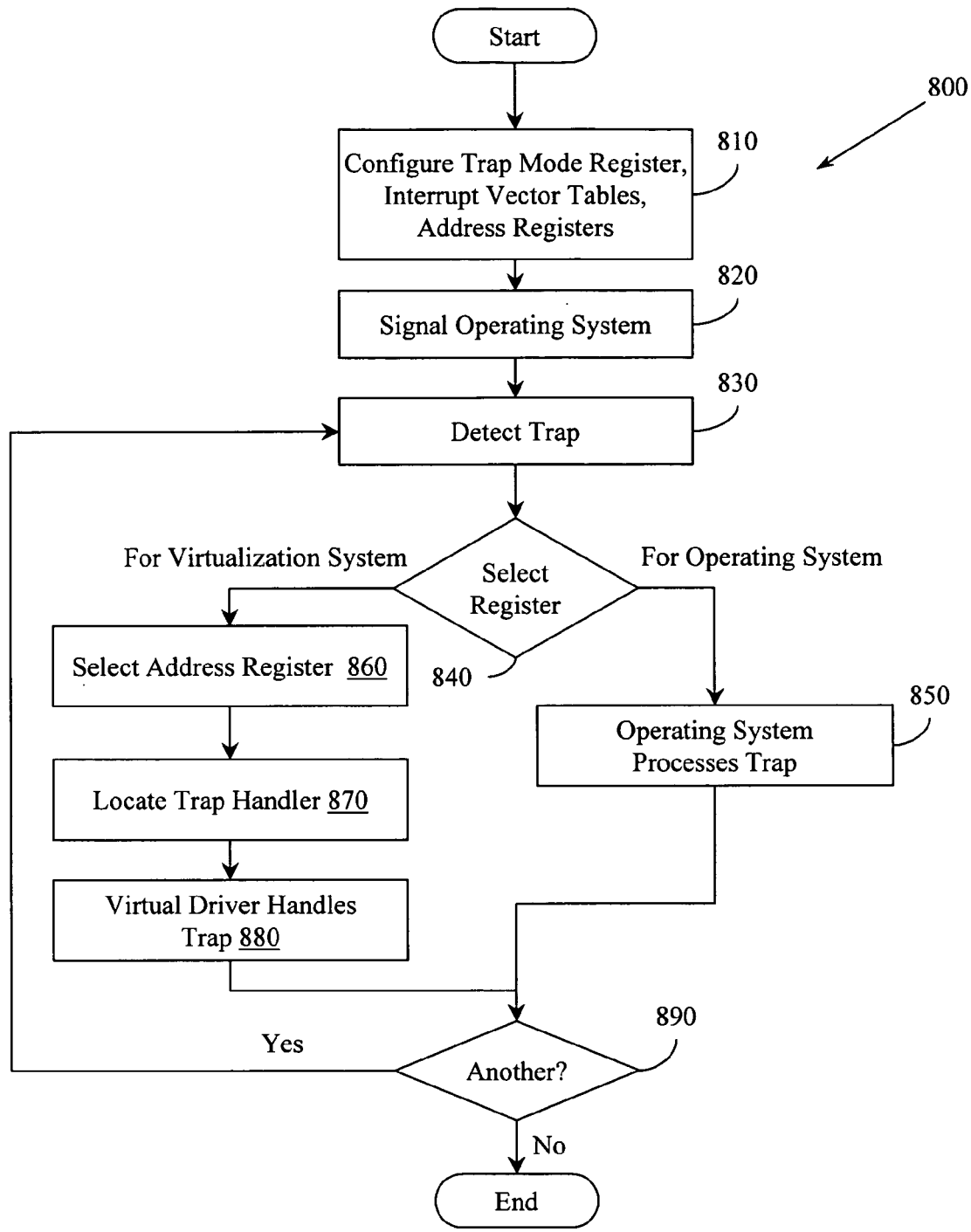
FIG. 12 illustrates another example method associated with handling interrupts in a computer system configured with a trap mode register, multiple address registers, and multiple vector tables.

FIG. 8 illustrates a method 800 associated with handling interrupts in a computer system configured with a trap mode register, multiple address registers, and multiple vector tables. FIG. 12 illustrates another example of method 800 that includes additional actions. At 810, configurations and initializations like those performed in method 700 (FIG. 7) may be performed. For example, a trap mode register, address registers, interrupt vector tables, and so on may be initialized. At 820, a signal may be sent to an operating system that the configurations of 810 are completed. The signal may cause the operating system to be booted. The operating system boot process may include, for example, initializing an address register, an interrupt vector table, and so on. By providing the signal to the operating system after the configurations are complete, code (e.g., virtualization code) associated with the configurations and initializations of 810 may be kept separate from and in some cases protected from an operating system. This may facilitate providing a virtualization system for an operating system and/or processor that was not initially designed to have a virtualization system. Similarly, this may facilitate providing systems like a debug system, a log system, and so on that the operating system and/or processor may not have had available.

Method 800 may also include, at 830, detecting a trap. The trap may be, for example, a first type of interrupt that will be handled by interrupt service routines associated with a first address register and a first interrupt vector table. The trap may also be, for example, a second type of interrupt that will be handled by interrupt service routines associated with one of a set of second address registers and one of a set of second interrupt vector tables. Thus, at 840, an address register may be selected to provide an address (e.g., interrupt vector table address). Which address register is chosen may depend, at least in part, on the type of trap detected at 830. Once the address register is chosen, an interrupt service routine may be located based, at least in part, on the selected address and the interrupt type.

In one example, when the interrupt can be handled by a virtualization system, processing may continue at 860. At 860, another round or rounds of address register selection may occur. In some examples, the address register already selected may remain the address register selected. In other examples, where there are multiple levels of virtualization, a series of address registers may be accessed before the address of an interrupt vector table is located. In one example, when the interrupt is an unimplemented address trap, method 800 may include, at 860, selecting an address register that is inaccessible to the operating system to provide an interrupt vector table address. Additionally, the interrupt vector table may be inaccessible to the operating system. The interrupt vector table may facilitate locating, at 870, an interrupt service routine provided by a virtualization firmware. The firmware and/or the interrupt service routine may be inaccessible to the operating system. At 880, a virtual device driver may handle the interrupt for the virtualization system. More generally, after an address register is selected at 860, an interrupt service routine may be located at 870 and then handle the interrupt at 880. At 890, a determination may be made concerning whether to process another trap. If the determination is Yes, then processing may return to 830, otherwise trap processing may conclude.

In one example, as illustrated in FIG. 12, when the interrupt can be handled by an operating system, processing may continue at 850 where control is transferred to an operating system and/or interrupt service routine accessible to and/or managed by the operating system. In the example, method 800 may also include, at 810, configuring a virtual device and making a description of the virtual device available to the operating system signaled at 820. Then, at 830, when a trap associated with the virtual device is detected, method 800 may include, at 840, selecting an address register associated with processing an interrupt for the virtual device. As described above, in virtualization systems with multiple levels of indirection and/or virtualization, a series of address registers may be accessed. Eventually, at 860, an address register with an address of an interrupt service routine will be located. Then, at 870, an interrupt service routine provided by a virtualization firmware can be located, where the interrupt service routine is configured to handle interrupts for the virtual device. Then, at 880, the virtual device driver may handle the interrupt.

In another example, the initializations and configurations of 810 may include establishing a trappable address range. Thus, upon detecting a trap at 830 that is associated with accessing a memory location in the trappable address range, method 800 may, at 840, include selecting an address register associated with processing an interrupt for the trappable address range. Then, at 870, method 800 may include locating an interrupt service routine provided by a virtualization firmware, where the interrupt service routine is configured to handle a trap for the trappable address range. At 880, the interrupt service routine may then execute in the firmware to handle the interrupt.

In one example, methodologies are implemented as processor executable instructions and/or operations provided on a computer-readable medium. Thus, in one example, a computer-readable medium may store processor executable instructions operable to perform a method that includes configuring a trap mode register to select one of a set of address registers to provide an address of an interrupt vector table. The address register selected may be determined, at least in part, on a trap type detected at the trap mode register. The method may also include configuring at least one interrupt vector table to facilitate locating an interrupt service routine configured to handle an interrupt associated with device virtualization. The method may also include configuring at least one address register to facilitate locating an interrupt service routine associated with an interrupt vector table. The method may also include signaling an operating system that trap mode register configuration, interrupt vector table configuration, and address register configuration is complete. In another example, the method may also include detecting a trap, selecting an address register to provide an interrupt vector table address based, at least in part, on the trap type, and locating an interrupt service routine based, at least in part, on the interrupt vector table address provided by the selected address register. While the above method is described being provided on a computer-readable medium, it is to be appreciated that other example methods described herein can also be provided on a computer-readable medium.

Figure 9:
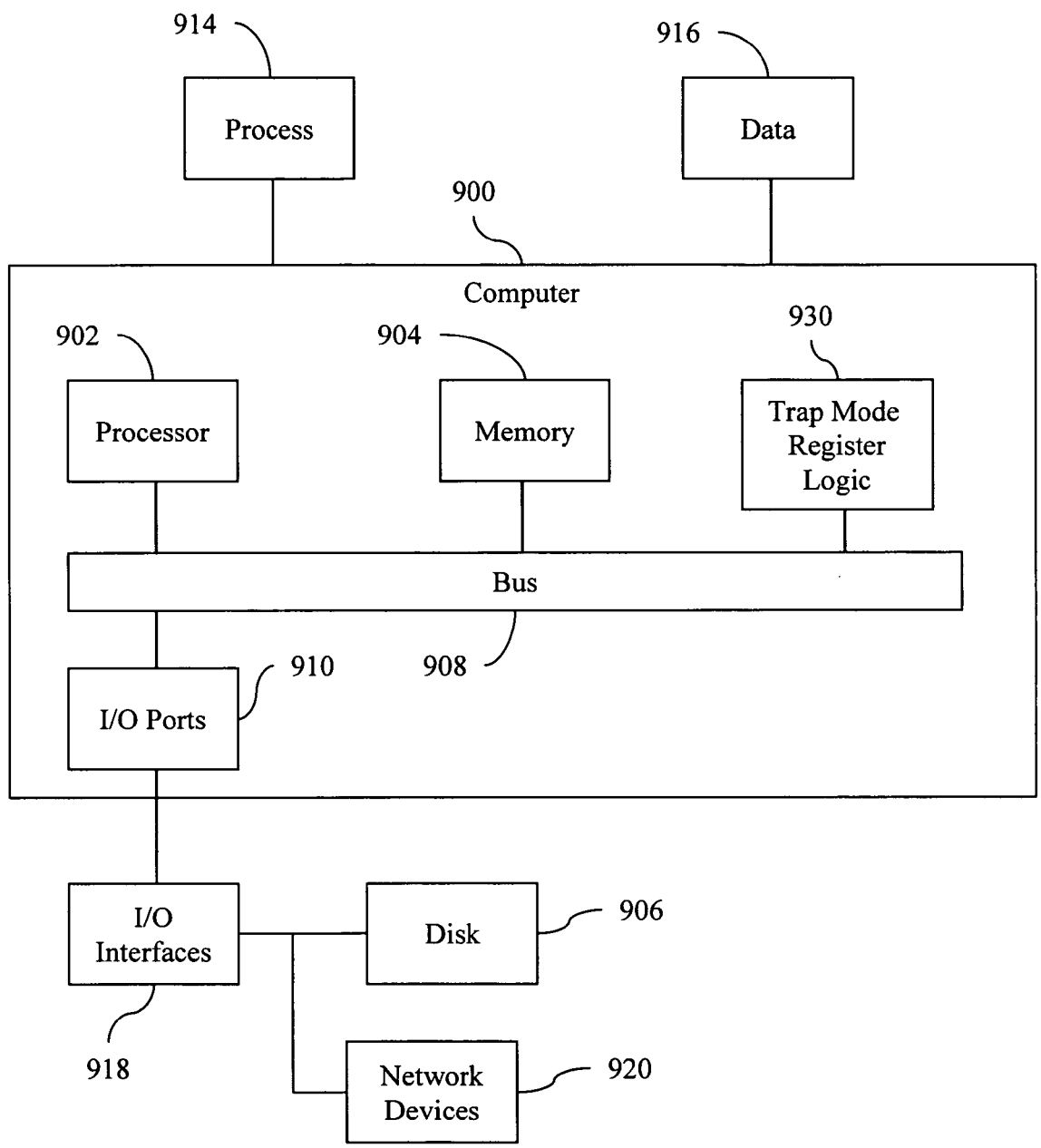
FIG. 9 illustrates an example computing environment in which example systems and methods illustrated herein can operate.

FIG. 9 illustrates a computer 900 that includes a processor 902, a memory 904, and input/output ports 910 operably connected by a bus 908. In one example, computer 900 may include a trap mode register logic 930 configured to facilitate accessing a trap mode register, multiple alternate address registers, and multiple alternate interrupt vector tables. While illustrated being operably connected to bus 908, in some examples logic 930 may be implemented in and/or more directly connected to processor 902.

Trap mode register logic 930, whether implemented in computer 900 as hardware, firmware, software, and/or a combination thereof may provide means for configuring and/or initializing portions of a computer system configured with a trap mode register, multiple interrupt vector address registers, and multiple interrupt vector tables. Trap mode register logic 930 may also provide means for detecting an unimplemented address trap presented to the trap mode register and means for selectively invoking an interrupt service routine associated with handling an unimplemented address trap. In one example, the interrupt service routine may be associated with an entry in one of the interrupt vector tables. Additionally, an interrupt vector table may be referenced through an interrupt vector address register. Thus, trap mode register logic 930 facilitates providing processor 902 with, for example, an external virtualization system.

The processor 902 can be a variety of various processors including dual microprocessor and other multi-processor architectures. The memory 904 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 906 may be operably connected to the computer 900 via, for example, an input/output interface (e.g., card, device) 918 and an input/output port 910. The disk 906 can include, but is not limited to, devices like a magnetic disk drive, a solid state disk drive, a floppy disk drive, a tape drive, a Zip drive, a flash memory card, and/or a memory stick. Furthermore, the disk 906 can include optical drives like a CD-ROM, a CD recordable drive (CD-R drive), a CD rewriteable drive (CD-RW drive), and/or a digital video ROM drive (DVD ROM). The memory 904 can store processes 914 and/or data 916, for example. The disk 906 and/or memory 904 can store an operating system that controls and allocates resources of the computer 900.

The bus 908 can be a single internal bus interconnect architecture and/or other bus or mesh architectures. While a single bus is illustrated, it is to be appreciated that computer 900 may communicate with various devices, logics, and peripherals using other busses that are not illustrated (e.g., PCIE, SATA, Infiniband, 1394, USB, Ethernet). The bus 908 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 900 may interact with input/output devices via i/o interfaces 918 and input/output ports 910. Input/output devices can include, but are not limited to, a keyboard, a microphone, a pointing and selection device, cameras, video cards, displays, disk 906, network devices 920, and the like. The input/output ports 910 can include but are not limited to, serial ports, parallel ports, and USB ports.

The computer 900 can operate in a network environment and thus may be connected to network devices 920 via the i/o interfaces 918, and/or the i/o ports 910. Through the network devices 920, the computer 900 may interact with a network. Through the network, the computer 900 may be logically connected to remote computers. The networks with which the computer 900 may interact include, but are not limited to, a local area network (LAN), a wide area network (WAN), and other networks. The network devices 920 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 920 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, and/or through a network may include combinations and mixtures of communications.

Thus, in one example, computer 900 may be a computer configured with a trap mode register, a plurality of interrupt vector address registers, and a plurality of interrupt vector tables. Computer 900 may include an initialization logic (not illustrated) that is configured to initialize the trap mode register, interrupt vector address registers, and interrupt vector table. The computer 900 may also include a trap processing logic that is configured to provide to the trap mode register, upon the occurrence of a trap in the computer, a trap data configured to facilitate the trap mode register selecting an interrupt vector address register, and thus to facilitate locating a trap handler associated with an interrupt vector table associated with the selected interrupt vector address register.

Figure 10:
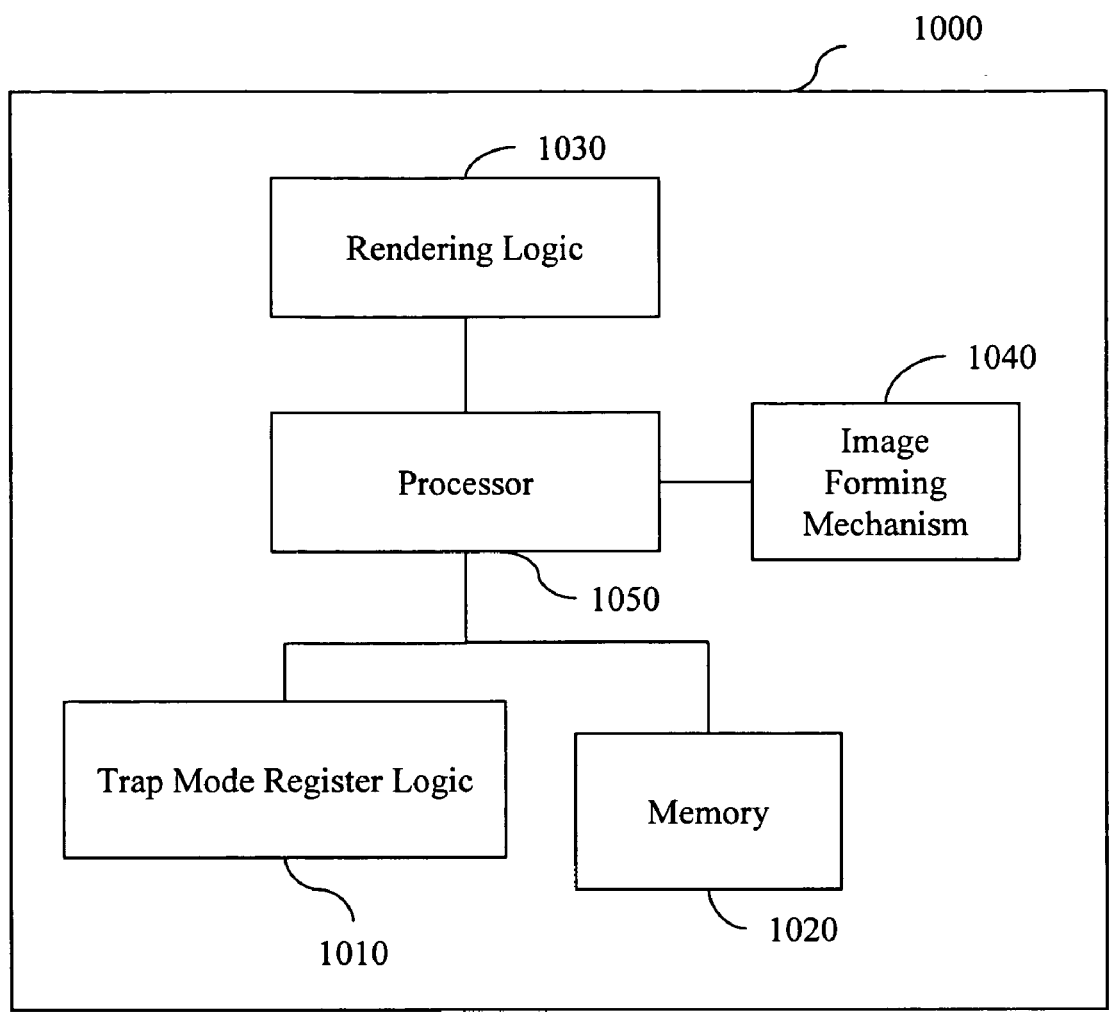
FIG. 10 illustrates an example image forming device in which example systems and methods illustrated herein can operate.

FIG. 10 illustrates an example image forming device 1000 that includes a trap mode register logic 1010 configured to implement example systems described herein. The trap mode register logic 1010 may also be configured to perform executable methods like those described herein. In one example, the trap mode register logic 1010 may be permanently and/or removably attached to the image forming device 1000.

The image forming device 1000 may receive print data to be rendered. Thus, image forming device 1000 may also include a memory 1020 configured to store print data or to be used more generally for image processing. The image forming device 1000 may also include a rendering logic 1030 configured to generate a printer-ready image from print data. Rendering varies based on the format of the data involved and the type of imaging device. In general, the rendering logic 1030 converts high-level data into a graphical image for display or printing (e.g., the print-ready image). For example, one form is ray-tracing that takes a mathematical model of a three-dimensional object or scene and converts it into a bit map image. Another example is the process of converting HTML into an image for display/printing. It is to be appreciated that the image forming device 1000 may receive printer-ready data that does not need to be rendered and thus the rendering logic 1030 may not appear in some image forming devices.

The image forming device 1000 may also include an image forming mechanism 1040 configured to generate an image onto print media from the print-ready image. The image forming mechanism 1040 may vary based on the type of the imaging device 1000 and may include a laser imaging mechanism, other toner-based imaging mechanisms, an ink jet mechanism, digital imaging mechanism, or other imaging reproduction engine. A processor 1050 may be included that is implemented with logic to control the operation of the image-forming device 1000. In one example, the processor 1050 includes logic that is capable of executing Java instructions. Other components of the image forming device 1000 are not described herein but may include media handling and storage mechanisms, sensors, controllers, and other components involved in the imaging process.

Figure 11:
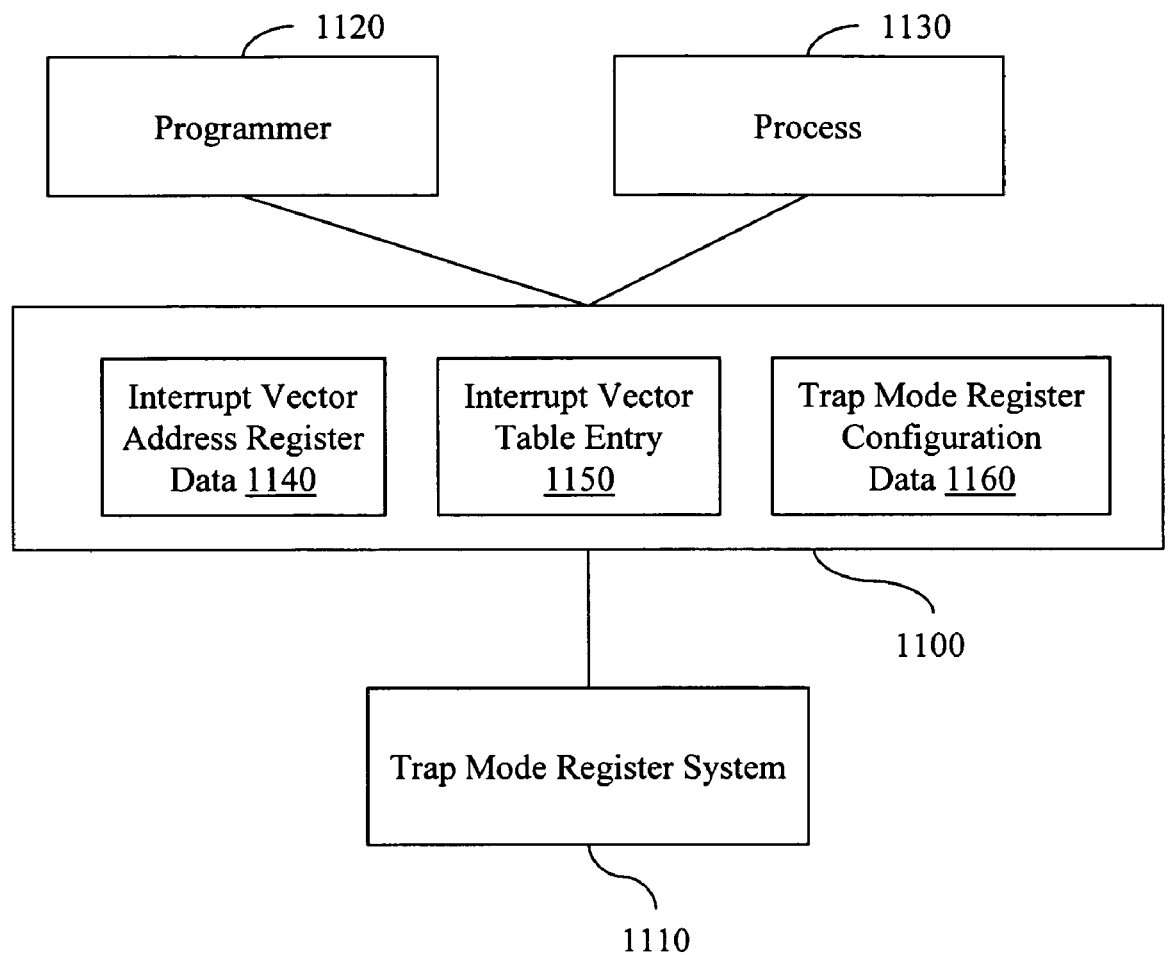
FIG. 11 illustrates an example application programming interface (API).

Referring now to FIG. 11, an application programming interface (API) 1100 is illustrated providing access to a trap mode register system 1110. The API 1100 can be employed, for example, by a programmer 1120 and/or a process 1130 to gain access to processing performed by system 1110. For example, a programmer 1120 can write a program to access system 1110 (e.g., invoke its operation, monitor its operation, control its operation) where writing the program is facilitated by the presence of API 1100. Rather than programmer 1120 having to understand the internals of system 1110, programmer 1120 merely has to learn the interface to system 1110. This facilitates encapsulating the functionality of system 1110 while exposing that functionality.

Similarly, the API 1100 can be employed to provide data values to system 1110 and/or retrieve data values from system 1110. For example, a process 1130 that processes interrupts for a virtual device can provide an interrupt service routine entry point to system 1110 via API 1100 by, for example, using a call provided in API 1100. Thus, in one example of API 1100, a set of application programming interfaces can be stored on a computer-readable medium. The interfaces can be employed by a programmer, computer component, logic, and so on, to gain access to a trap mode register system 1110. The interfaces can include, but are not limited to, a first interface 1140 that communicates an interrupt vector address register data, a second interface 1150 that communicates an interrupt vector table entry, and a third interface 1160 that communicates a trap mode register configuration data associated with the interrupt vector address register data and the interrupt vector table entry. In one example, the trap mode register configuration data facilitates selecting an interrupt vector address and locating an interrupt vector table entry.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system, comprising:
    a first interrupt vector table configured to facilitate locating an interrupt service routine associated with handling one of a first set of interrupt types;
    a first address register configured to provide an address associated with the first interrupt vector table and to facilitate locating an entry in the first interrupt vector table;
    a second interrupt vector table configured to facilitate locating an interrupt service routine associated with handling one of a second set of interrupt types;
    a second address register configured to provide an address associated with the second interrupt vector table and to facilitate locating an entry in the second interrupt vector table;
    a trap mode register operably connected to a computer system, the trap mode register being configured:
        to receive, upon the occurrence of a trap in the computer system, a trap data associated with the trap, where the trap data includes an address associated with one or more of, a device responsible for causing the trap, and a memory location responsible for causing the trap, and
        to facilitate selecting between the first address register and the second address register to provide an address associated with an interrupt vector table, where the selecting is based, at least in part, on the address in the trap data; and
    an initialization logic configured to initialize the trap made register, the second interrupt vector table, and the second address register. and to provide a signal for controlling, at least in part, an operating system initialization logic operably connected to the computer system.

2. The system of claim 1, where the trap data further includes a trap type identifier.

3. The system of claim 1, where the trap may be an unimplemented address trap and where an unimplemented address trap is a member of the second set of interrupt types and controls the trap mode register to select the second address register.

4. The system of claim 3, where the unimplemented address trap may be generated by an attempt by the computer system to access an address associated with a trappable address range.

5. The system of claim 3, where the unimplemented address trap may be generated by an action associated with a virtual device operably connected to the computer system.

6. The system of claim 1, where the first interrupt vector table is initialized by and is accessible to an operating system configured to run on the computer system and to be initialized by the operating system initialization logic.

7. The system of claim 6, where the first interrupt vector table facilitates locating an interrupt service routine by storing one or more of, a set of interrupt service routine entry points, and a set of interrupt service routines.

8. The system of claim 7, where the first interrupt vector table may be indexed by an element of the trap data.

9. The system of claim 6, where the second interrupt vector table is initialized by the initialization logic and is inaccessible to an operating system initialized by the operating system initialization logic.

10. The system of claim 9, where the second interrupt vector table facilitates locating an interrupt service routine by storing one or more of, a set of interrupt service routine entry points, and a set of interrupt service routines.

11. The system of claim 10, where the second interrupt vector table may be indexed by an element of the trap data.

12. The system of claim 1. comprising a data store configured to store a trappable address range.

13. The system of claim 12, the initialization logic being configured to store a trappable address range in the data store, and where an attempt by the computer system to access an address in the trappable address range will cause an unimplemented address trap.

14. The system of claim 1, the initialization logic being configured to define a virtual device and to provide information concerning the virtual device to the operating system initialized by the operating system initialization logic.

15. The system of claim 1, the initialization logic being configured to initialize the trap mode register to select the first address register when the trap is a member of the first set of interrupt types and to select the second address register when the trap is a member of the second set of interrupt types.

16. The system of claim 15, the second set of interrupt types including an unimplemented address trap.

17. The system of claim 16, the initialization logic being configured to initialize the second interrupt vector table with one or more of, a set of interrupt service routine entry points, and a set of interrupt service routines, where the set of interrupt service routines comprise a portion of a virtualization system, and where the set of interrupt service routines are located in the initialization logic.

18. The system of claim 17, the initialization logic being configured to initialize the second address register with the address of the second interrupt vector table.

19. The system of claim 18, the initialization logic being configured to provide the signal to the operating system initialization logic after initializing the trap mode register, the second interrupt vector table, and the second address register, the signal being configured to cause an operating system initialized by the operating system initialization logic to begin operation.

20. The system of claim 1, comprising a secure mode logic configured to control access to a protected address range associated with the computer system, where a memory location in the protected address range is accessible to the initialization logic and inaccessible to an operating system running on the computer system.

21. The system of claim 20, where one or more of, the trap mode register, the second address register, and the second interrupt vector table are located in the protected address range.

22. The system of claim 20, the trap mode register comprising:
a first field configured to store a trap type data; and
a second field configured to store information concerning whether a trap type will control a processor in the computer system to enter a secure mode.

23. The system of claim 22, the trap mode register comprising:
a third field configured to store information concerning whether a trap type is enabled.

24. The system of claim 22, the trap mode register comprising:
a third field configured to store information concerning whether a trap type is to be handled in the secure mode.

25. The system of claim 1, comprising:
a translation lookaside buffer configured to store information concerning a physical/virtual memory mapping; and
a translation lockaside buffer logic configured to selectively set an address range attribute in a translation lookaside buffer entry.

26. The system of claim 25, the translation lookaside buffer logic being configured to selectively invoke a virtualization process when an unimplemented address range trap occurs.

27. A system, comprising:
a first interrupt vector table configured to facilitate locating an interrupt service routine associated with handling one of a first set of interrupt types, where the first interrupt vector table is initialized by and is accessible to an operating system configured to run on a computer system;
a first address register configured to provide an address associated with the first interrupt vector table and to facilitate locating an entry in the first interrupt vector table;
a second interrupt vector table configured to facilitate locating an interrupt service routine associated with handling one of a second set of interrupt types, where an unimplemented address trap is a member of the second set of interrupt types and controls the trap mode register to select the second address register, where an unimplemented address trap may be generated by one or more of, an attempt by the computer system to access an address associated with a trappable address range, and an action associated with a virtual device operably connected to the computer system;
a second address register configured to provide an address associated with the second interrupt vector table and to facilitate locating an entry in the second interrupt vector table;
a trap mode register operably connected to a computer system, the trap mode register being configured to receive, upon the occurrence of a trap in the computer system, a trap data associated with the traps where the trap data includes an address associated with one or more of, a device responsible for causing the trap, and a memory location responsible for causing the trap, and to facilitate selecting between the first address register and the second address register to provide an address associated with an interrupt vector table based, at least in part, on an address in the trap data; and
an initialization logic configured to initialize the trap mode register to select the first address register when the trap is a member of the first set of interrupt types and to select the second address register when the trap is a member of the second set of interrupt types, to initialize the second interrupt vector table with one or more of, a set of interrupt service routine entry points, and a set of interrupt service routines, where the set of interrupt service routines comprise a portion of a virtualization system, and where the set of interrupt service routines are stored in the initialization logic, to initialize the second address register, and to provide a signal for controlling an operating system initialization logic operably connected to the computer system; and
where the second interrupt vector table is initialized by the initialization logic and is inaccessible to an operating system initialized by the operating system initialization logic.

28. A method, comprising:
configuring a trap mode register to select one of a plurality of address registers to provide an address of one of a plurality of interrupt vector tables based, at least in part, on a trap data, where the trap data is received in response to an occurrence of a trap, and where the trap data includes an address associated with one or more of, a device responsible for causing the trap, and a memory location responsible for causing the trap, where the plurality of interrupt vector tables are associated with a plurality of interrupt types, where the selecting is based, at least in part, on the address in the trap data;
configuring at least one of the plurality of interrupt vector tables to facilitate locating an interrupt service routine configured to handle a trap associated with device virtualization;
configuring at least one of the plurality of address registers to facilitate locating an interrupt service routine associated with the one or more interrupt vector tables, where the locating is based, at least in part, on an address in received trap data; and
signaling an operating system that trap mode register configuration, interrupt vector table configuration, and address register configuration is complete.

29. The method of claim 28, where configuring the trap mode register includes relating a trap type to one of the plurality of address registers.

30. The method of claim 29, where configuring the trap mode register includes selectively relating a secure mode transition indicator with a trap type.

31. The method of claim 30, where configuring the trap mode register includes selectively relating a disabled indicator with a trap type.

32. The method of claim 31, where configuring the trap mode register includes selectively relating a perform in secure mode indicator with a trap type.

33. The method of claim 28, where configuring an interrupt vector table includes one or more of, establishing a set of interrupt service routine entry points in the interrupt vector table, and establishing a set of interrupt service routines in the interrupt vector table.

34. The method of claim 28, where configuring an address register includes storing in the address register an address associated with the interrupt vector table that relates the interrupt vector table to the address register.

35. The method of claim 28, where signaling an operating system includes providing a signal that controls a boot logic to initiate an operating system boot process.

36. The method of claim 28, including:
detecting a trap;
selecting an address register to provide an interrupt vector table address based, at least in part, on the trap type; and
locating an interrupt service routine based, at least in part, on the interrupt vector table address provided by the selected address register.

37. The method of claim 36, including:
when the trap type is an unimplemented address trap, selecting an address register that is inaccessible to the operating system to provide an interrupt vector table address, the interrupt vector table being inaccessible to the operating system, and where the interrupt vector table facilitates locating an interrupt service routine provided by a virtualization firmware, where the firmware and the interrupt service routine are inaccessible to the operating system.

38. The method of claim 28, including:
configuring a virtual device;
providing a description of the virtual device to the operating system; and
when a trap associated with the virtual device is detected, selecting an address register associated with processing a trap for the virtual device, and locating an interrupt service routine provided by a virtualization firmware, where the interrupt service routine is configured to handle interrupts for the virtual device.

39. The method of claim 28, including:
establishing a trappable address range: and
upon detecting a trap associated with accessing a memory location in the trappable address range, selecting an address register associated with processing a trap for the trappable address range, and locating an interrupt service routine provided by a virtualization firmware, where the interrupt service routine is configured to handle a trap for the trappable address range.

40. A method, comprising:
configuring a trap mode register to select one of a plurality of address registers to provide an address of one of a plurality of interrupt vector tables based, at least in part, on a trap data, where the trap data is received in response to an occurrence of a trap, and where the trap data includes an address associated with one or more of, a device responsible for causing the trap, and a memory location responsible for causing the trap, and where configuring the trap mode register includes relating a trap type to an address register, selectively relating a secure mode transition indicator with a trap type, and selectively relating a disabled indicator with a trap type;
configuring at least one of the plurality of interrupt vector tables to facilitate locating an interrupt service routine configured to handle a trap associated with device virtualization, where configuring an interrupt vector table includes one or more of, establishing a set of interrupt service routine entry points in the interrupt vector table, and establishing a set of interrupt service routines in the interrupt vector table;
configuring at least one of the plurality of address registers to facilitate locating an interrupt service routine associated with the one or more interrupt vector tables, where the locating is based, at least in part, on an address in received trap data, and where configuring the address register includes storing in the address register an address associated with the interrupt vector table that relates the interrupt vector table to the address register;
signaling an operating system that trap mode register configuration, interrupt vector table configuration, and address register configuration is complete, where signaling an operating system includes providing a signal that controls a boot logic to initiate an operating system boot process;
detecting a trap by receiving trap data associated with the trap;
selecting an address register to provide an interrupt vector table address based, at least in part, on an address in the trap data; and
locating an interrupt service routine based, at least in part, on the interrupt vector table address provided by the selected address register, where the locating is based on an address in the trap data.

* * * * *

UNITED STATES PATENT AND TRADEMARK OFFICE
CERTIFICATE OF CORRECTION

PATENT NO. : 7,480,755 B2  Page 1 of 1
APPLICATION NO. : 11/006964
DATED : January 20, 2009
INVENTOR(S) : Russ Herrell et al.

It is certified that error appears in the above-identified patent and that said Letters Patent is hereby corrected as shown below:

In column 2, line 56, delete "medium," and insert -- media --, therefor.

In column 2, line 56, delete "optical medium," and insert -- optical media, --, therefor.

In column 2, line 57, delete "medium" and insert -- media --, therefor.

In column 18, line 6, in Claim 1, delete "made" and insert -- mode --, therefor.

In column 18, line 8, in Claim 1, delete "register." and insert -- register, --, therefor.

In column 18, line 45, in Claim 12, delete "claim 1." and insert -- claim 1, --, therefor.

In column 19, line 42, in Claim 25, delete "lockaside" and insert -- lookaside --, therefor.

In column 20, line 11, in Claim 27, delete "traps" and insert -- trap, --, therefor.

In column 21, line 47, in Claim 39, delete "range:" and insert -- range; --, therefor.

Signed and Sealed this

Twenty-sixth Day of May, 2009

JOHN DOLL
*Acting Director of the United States Patent and Trademark Office*